United States Patent Office 3,439,055
Patented Apr. 15, 1969

3,439,055
PROCESS FOR THE PREPARATION OF HEXA-
METHYL - BICYCLO[2,2,0]HEXADIENE - (2,5)
("HEXAMETHYL-DEWAR-BENZOL")
Wolfgang Schäfer, Marl, Germany, assignor to Chemische
Werke Huls Aktiengesellschaft, Marl, Germany, a corporation of Germany
No Drawing. Filed May 1, 1967, Ser. No. 634,825
Claims priority, application Germany, Dec. 14, 1966,
C 40,965
Int. Cl. C07c 3/04, 3/18
U.S. Cl. 260—666                                    4 Claims

ABSTRACT OF THE DISCLOSURE

Hexamethyl-bicyclo[2,2,0]hexadiene-(2,5) is made by intimately contacting butine-(2) with a catalyst selected from the group consisting of aluminum chloride, aluminum bromide, alkyl aluminum dichlorides and alkylaluminum dibromides at a temperature within the range from 0 to 50° C. in the presence of an inert solvent.

---

The object of the invention is a single-stage process for the preparation of hexamethyl-bicyclo[2,2,0]hexadiene-(2,5) ("Hexamethyl-Dewar-Benzol") by trimerizing butine-(2) with aluminum chloride, aluminum bromide, alkylaluminum dichlorides or alkylaluminum dibromides as catalysts.

Hexamethyl-bicyclo[2,2,0]hexadiene-(2,5) has not been described heretofore. In "Proceedings of the Chemical Society" (London) 1961, page 312 there is only expressed the presumption that during the preparation of hexamethylbenzene, by treatment of tetramethyl-3,4-dichloro-cyclobutene with activated zinc dust in the presence of butine-(2), an intermediate hexamethyl-bicyclo[2,2,0]hexadiene-(2,5) is generated. However, this substance was not isolated.

It has now been found that hexamethyl-bicyclo[2,2,0]-hexadiene-(2,5) can be prepared in a simple manner and with good yields if butine-(2) is treated at temperatures ranging from 0 to 50° C. and in the presence of an inert solvent with anhydrous aluminum chloride, aluminum bromide, alkylaluminum dichlorides or alkylaluminum dibromides. The employment of aluminum chloride at temperatures ranging from 30 to 40° C. is preferred.

The butine-(2), employed as raw material, is available industrially, for example as a by-product of butane-dehydrogenation into butadiene-(1,3) by means of the single-stage Houdry process.

Impurities which may be present in industrially produced butine-(2) as traces or quantities up to a few percent, such as 1-butene, iso-butene, trans- and cis-butene-(2), pentadiene-1,4, iso-pentene, butadiene-(1,3) and -(1,2), butine-(1), isoprene and the like, will not inhibit the trimerization. For example, it is possible to carry out the reaction with a butine-(2) content of only 80%. A portion of the above listed impurities are changed chemically but this does not impede the processing of the reaction mixture.

Inert solvents suitable for the process of the invention are for example aromatic hydrocarbons, such as benzene or toluene as well as halogenhydrocarbons such as methylenechloride.

Neither the inert solvent nor the butine-(2) requires special desiccation, and the aluminum chloride or bromide need not be freshly sublimed. The traces of water usually contained in commercially available solvents or in the butine-(2) will not inhibit the trimerization provided a sufficiently large quantity of catalyst is used. Only a relatively high water content will render the catalysts inoperative due to hydrolysis.

However, in order to attain very uniform results it is advantageous to desiccate the inert solvents and the butine-(2) in a suitable manner and to employ freshly sublimed aluminum chloride or bromide.

The quantity of the anhydrous catalyst employed can be varied within a wide range. Quantities ranging from 0.5 to 10% by weight, especially between 3 and 8% by weight, relative to the quantity of butine-(2) have proved to be efficient. Aluminum chloride in the amount of 5 percent by weight is employed most advantageously. If smaller quantities are used the reaction time must be extended in order to attain equal conversion (provided the reaction temperature remains unchanged). If a greater quantity of aluminum chloride is employed, the reaction time is reduced. If alkylaluminum dichlorides or bromides are used, it is advisable to employ quantities ranging from 5 to 10% by weight.

The course of the reaction is controlled decisively by the reaction temperature. If approximately 5% by weight of aluminum chloride is used, it is possible to obtain, after a reaction time of 6 to 7 hours and a temperature of 35° C. a 70% yield of the hexamethyl-bicyclo[2,2,0]hexadiene-(2,5). At temperatures below 20° C. the rate of reaction is slow so that a sufficient conversion will require reaction periods of 24 hours and more. At temperatures above 50° C. the yield of hexamethyl-bicyclo[2,2,0]-hexadiene-(2,5) will fall off very significantly, and the formation of the secondary product hexamethylbenzene is promoted. It is feasible to obtain hexamethyl-bicyclo-[2,2,0]hexadiene-(2,5) at temperatures above 50° C. by selecting very brief reaction periods but this method of operation is difficult to carry out in practice and the uniformity of the result is questionable.

The alkylaluminum dichlorides and alkylaluminum dibromides require a reaction time which is twice or more the time needed for aluminum chloride in order to attain the same butine conversion.

The process of the invention is most expediently carried out by suspending or dissolving the catalyst in the inert solvent, bringing the mixture up to the reaction temperature selected, and adding, with stirring, butine-(2) drop-by-drop. After a certain reaction time, depending on the quantity and type of the catalyst, water is added drop-by-drop with cooling and the organic phase is separated immediately from the aqueous phase and washed to neutrality. It is more advantageous however, to add the reaction product with stirring to a mixture of ice and water to which a small amount of alkali, such as sodium carbonate or sodiumbicarbonate has been added. The hexamethyl-bicyclo[2,2,0]hexadiene-(2,5) is then separated from the organic phase by fractional distillation. The product so obtained is of great purity.

The trimerization of the butine-(2) into "Hexamethyl-Dewar-Benzol" occurs probably through the stage of the unstable tetramethylcyclobutadiene which immediately reacts further with butine-(2), present in excess, to form the hexamethyl-bicyclo[2,2,0]hexadiene-(2,5) as follows:

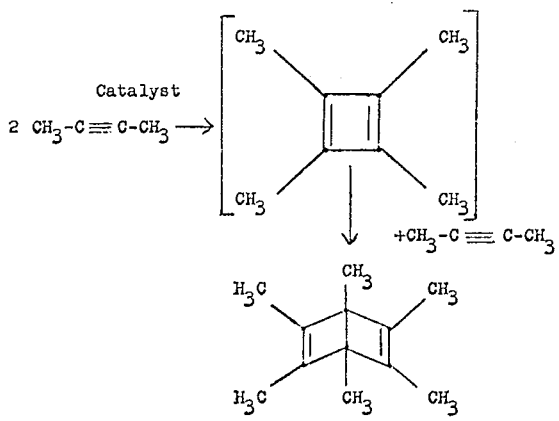

Hexamethyl-bicyclo[2,2,0]hexadiene-(2,5) is a colorless liquid which will solidify in crystalline form at 7.5° C. In the absence of acids, oxygen and moisture and with exclusion of light it is stable and can be stored. Its structure was determined by elementary analysis, determination of the molecular weight, nuclear reasonance-, infrared- and ultraviolet-spectra as well as by quantitative change into hexamethyl-benzene.

The process of the invention permits the synthesis of the Dewar-benzene-derivative from a raw material that is available industrially. It is a reaction which can be carried out simply and quickly in a single stage and on an industrial scale and which will result in good yields.

It is surprising that under the conditions of the process of the invention hexamethyl-bicyclo[2,2,0]hexadiene-(2,5) can be prepared at good yield. The catalyst present in the reaction mixture effects not only the formation but also the transformation of the bicyclo[2,2,0]hexadiene-(2,5) into the more stable hexamethylbenzene. At temperatures above 50° C. this transformation takes place rather rapidly and the Dewar-benzene-derivative can be obtained at such temperatures only with difficulty and in small quantities. However, at temperatures near 35° C. the trimerization of the butine-(2) into hexamethyl-bicyclo[2,2,0]hexadiene-(2,5) is relatively rapid while the transformation into hexamethylbenzene is relatively slow.

Hexamethyl-bicyclo[2,2,0]hexadiene-(2,5) is a valuable intermediate product which can be transformed for example into polyhydric alcohols, such as hexamethyl-5,6-dihydroxy-bicyclo[2,2,0]hex-1-ene by air oxydation, or epoxides by oxidizing reactions, i.e., for example by treating with peroxy benzoic acid, or into pentamethyl-5-vinyl-cyclopentadiene in a simple manner.

EXAMPLES 1 TO 7

These examples demonstrate the influence of the temperature on the course of the reaction. They prove also that not only freshly sublimed aluminum chloride but also commercially available aluminum chloride powder can be employed.

General method of operation

Into a 4-liter flask, equipped with stirrer, thermometer, reflux condenser with attached calcium chloride pipe and dropping funnel, there are placed 50 grams of anhydrous aluminum chloride and 1 liter of benzene, desiccated over sodium, and this mixture is raised to the reaction temperature by means of a water bath. Then 1 kg. of butine-(2), desiccated over sodium, is added drop-by-drop with stirring over a period of 2.5 hours. The reaction mixture becomes dark brown immediately and the exothermic reaction starts so that external cooling is required to maintain the reaction temperature. After the addition of the butine-(2) the reaction is allowed to continue at the selected reaction temperature with stirring. Thereupon the contents of the flask are cooled to 0 to 5° C. and 100 ml. of water are added drop-by-drop, initially very slowly, with continued cooling until the reaction mixture becomes light-yellow.

For the purpose of determining the conversion factor, the not converted butine-(2) is removed from the reaction mixture by application of a vacuum between 100 and 200 torr at room temperature. It will distill off and is collected, together with a small amount of benzene, in a cold trap (−75° C.) placed in front of the pump. By fractionation of the contents of the cold trap in a 1 m.-column not converted butine-(2) can be reclaimed within a boiling range of 26 to 29° C.

Upon removal of the butine the organic phase is separated from the aqueous phase and is washed to neutrality with water and aqueous sodium hydrogen carbonate solution. If hexamethylbenzene precipitates in crystalline form from the benzene solution, it is removed by suction. By vacuum distillation of the filtrate through a 1 m.-column there is obtained, after a benzene first-run, hexamethyl-bicyclo[2,2,0]hexadiene-(2,5) in the form of a colorless liquid having a boiling point of 43 to 45°/15 torr; $n_D^{20}$:1.4479; melting point 7° C. Usually, some additional hexamethylbenzene can be separated by suction from the distillation residue after cooling off. By washing with methanol it is freed from any oil traces. The remaining mother-liquor is an oil of very complex composition.

The test results obtained under varying conditions of reaction are summarized in Table 1.

The butine-(2) had the following gas-chromatographically determined composition in case of all examples: butine-(2)=92.7%; isoprene=0.2%; butadiene-(1,2)=1.5%; butadiene-(1,3)=0.4%; butine-(1)=5.0%; others −0.2% all by weight.

TABLE 1.—COURSE OF THE BUTINE-(2) TRIMERIZATION UNDER VARIOUS CONDITIONS OF REACTION

| Example No. | Reaction temperature, °C. | AlCl₃ quality | Follow-up reaction time (hours) | Conversion percent | Yield relative to the converted butine of— | | | | Distillation residue (oil), gram |
|---|---|---|---|---|---|---|---|---|---|
| | | | | | Hexamethyl-bicyclo [2,2,0] hexadiene-(2,5) | | Hexamethylbenzene (raw product) | | |
| | | | | | Percent computed | G. | Percent computed | G. | |
| 1 | 50 | Commerc. product | 4 | 99 | 19.1 | 175 | 52.3 | 481 | 165 |
| 2 | 40 | Freshly sublim | 4 | 86 | 48.3 | 385 | 39.5 | 315 | 116 |
| 3 | 40 | Commerc. product | 4.5 | 76 | 54.5 | 384 | 17.0 | 120 | 90 |
| 4 | 35 | Freshly sublim | 4 | 76 | 69.0 | 486 | 21.0 | 148 | 64 |
| 5 | 30 | Commerc. product | 4 | 81 | 69.9 | 520 | 25.3 | 190 | 60 |
| 6 | 25 | do | 4 | 49 | 66.0 | 300 | 20.7 | 94 | 40 |
| 7 | 20 | Freshly sublim | 19 | 66 | 69.4 | 424 | 19.3 | 118 | 60 |

EXAMPLE 8

Into the reaction flask, described in Examples 1 to 7, there were placed 1 liter of toluene, desiccated over sodium, as well as 50 gram of freshly sublimed aluminum chloride and this mixture was heated to 35° C. Then 1 kg. of butine-(2), desiccated over sodium, was added drop-by-drop with stirring, over a period of 2.5 hours. The temperature of the reaction mixture was kept at 35° C. by external cooling. After the addition of all of the butine-(2) the mixture was allowed to react at 35° C. and with stirring for another 4 hours. Thereupon the contents of the flask was cooled to 0 to 5° C. and 100 ml. of water was added drop-by-drop, initially very slowly, with continued cooling.

The reaction mixture was freed of the not converted butine-(2) and further processed as described in Examples 1 to 7. 72% of the butine employed were converted. The yield was 275 grams (41.1% of the computed value relative to the converted quantity of butine) of hexamethyl-bicyclo[2,2,0]hexadiene-(2,5) and 132 grams (19.8% of the computed value) of hexamethylbenzene. The distillation residue (oil) had a weight of 95 grams.

EXAMPLE 9

Into the reaction flask described in Examples 1 to 7 there were placed 1 liter of methylenechloride, desiccated over calcium chloride as well as 50 grams of freshly sublimed aluminum chloride and this mixture was heated to 35° C. Then 1 kg. of butine-(2), desiccated over sodium, was added drop-by-drop with stirring over a period of 2.5 hours. The temperature of the reaction mixture was maintained at 35° C. by external cooling. After the addition of the butine-(2) the mixture was allowed to react at 35° C. with stirring for another 4 hours. Thereupon the contents of the flask was cooled to 0 to 5° C. and 100 ml. of water was added drop-by-drop, initially very slowly, with continued cooling. The reaction mixture was freed of the not converted butine-(2) and further processed as described in Examples 1 to 7. 70% of the butine employed was converted. The yield was 400 grams (61.7% of the computed value relative to the converted quantity of butine) of hexamethyl-bicyclo[2,2,0]hexadiene-(2,5) and 193 grams (29.8% of the computed value) of hexamethylbenzene. The distillation resdue (oil) had a weight of 90 grams.

EXAMPLE 10

A 10-liter vessel with footvalve, heating jacket (thermostatically controlled circulating heat set at 34° C.), cooling coil, reflux condenser, contact thermometer and stirrer (200 r.p.m.) was used as the reaction vessel. To the cooling coil there was connected a cooling-water circulation (temperature 25 to 3° C.) which was arranged to be cut in by the contact thermometer if the temperature exceeds 35° C.

Into the vessel there was placed 4 liters of dry benzene and 250 grams of anhydrous aluminum chloride (commercial product) and 3.5 kg. of butine-(2) measured out over a period of 1½ hours. Thereupon the mixture was stirred for 6 hours. During the entire reaction period the temperature of the mixture was maintained automatically at 34 to 35° C. The mixture was then allowed to flow with stirring into approximately 5 kg. of crushed ice to which 200 grams of sodium bicarbonate had been added. The aqueous phase was then separated and the organic phase was washed once more with water. Not converted butine-(2) and the main portion of the benzene was then distilled off in a steam heated film evaporator at 200 torr. By rectification of the distillate 500 to 600 grams of butine-(2) was reclaimed at a boiling point of 26 to 28° C., to be used with the next batch.

The butine-free sump product obtained in the film evaporator was cooled to 5° C. Approximately 250 to 350 grams of hexamethylbenzene precipitates during this operation and was separated by filtration. The filtrate was distilled in a water jet vacuum through a 1 m.-packed tower, and 1,650 to 1,750 grams of hexamethyl-Dewar-benzene was obtained as main fraction at boiling point 60 to 62° C./20 torr. The distillation residue (700 to 750 g.) consisted of approximately equal parts of hexamethylbenzene and a complex oil residue.

EXAMPLE 11

Into a 4-liter flask equipped with stirrer, reflux condenser, thermometer and dropping funnel, and placed in a water bath of 35° C., there was poured 1 liter of dry benzene and 50 grams of anhydrous aluminum bromide. Then 1 kg. of butine-(2) was added drop-by-drop with stirring over a period of 2 hours. The stirring was then continued for another 30 hours at a temperature of 350 C. Thereupon the reaction product was poured with stirring into ice, the benzene layer was separated, washed with water, desiccated over anhydrous sodium sulphate and subjected to fractional distillation through a 60 cm.-packed tower. 460 grams of butine-(2), boiling point 60 to 62° C./20 torr was reclaimed. Following a fraction composed of benzene, 280 grams of hexamethyl-Dewar-benzene having boiling point 60 to 62° C./20 torr. was recovered. (Distillation residue: 160 grams, composed of approximately 100 grams of hexamethylbenzene, the remainder being oil.)

EXAMPLE 12

Into a 4-liter flask equipped with stirrer, reflux condenser, thermometer and dropping funnel, and placed in a water bath of 35° C., there was poured 1 liter of dry benzene and 50 grams of ethylaluminumdibromide. Then 1 kg. of butine-(2) was added drop-by-drop with stirring over a period of 2 hours. The stirring was then continued for another 50 hours at a temperature of 35° C. The reaction mixture was further processed as explained in Example 11. 560 grams of butine-(2) was reclaimed. The yield of hexamethyl-Dewar-benzene was 171 grams. In addition thereto 30 grams of hexamethylbenzene and 87 grams of oil were separated.

EXAMPLE 13

Into a 4-liter flask equipped with stirrer, reflux condenser, thermometer and dropping funnel, and placed in a water bath of 35° C., there was poured 1 liter of dry benzene and 50 grams of isobutylaluminum dibromide. Then 1 kg. of butine-(2) was added drop-by-drop with stirring over a period of 2 hours. The stirring was then continued for another 50 hours and at a temperature of 35° C. The reaction mixture was further processed as explained in Example 11. 570 grams of butine-(2) was reclaimed. The yield was 150 grams of hexamethyl-Dewar-benzene and 84 grams of by-products.

EXAMPLE 14

Into a 4-liter flask equipped with stirrer, reflux condenser, thermometer and dropping funnel, and placed in a water bath of 35° C., there was poured 1 liter of dry benzene and 50 grams of ethylaluminum dichloride. Then 1 kg. of butine-(2) was added drop-by-drop with stirring over a period of 2 hours. The stirring was then continued for another 30 hours at a temperature of 35° C. The reaction mixture was further processed as explained in Example 11. 220 grams of butine-(2) was reclaimed. The yield was 508 grams of hexamethyl-Dewar-benzene. The distillation residue weight was 155 grams of which 50 grams was hexamethylbenzene.

EXAMPLE 15

Into a 4-liter flask equipped with stirrer, reflux condenser, thermometer and dropping funnel, and placed in a water bath of 35° C., there was poured 1 liter of dry benzene and 50 grams of n-propylaluminum dichloride. Then 1 kg. of butine-(2) was added drop-by-drop with stirring over a period of 2 hours. The stirring was then continued for another 30 hours at 35° C. The reaction mixture was further processed as explained in Example 11. 310 grams of butine-(2), 322 grams of hexamethyl-Dewar-benzene and 278 grams of distillation residues (including 50 grams of hexamethylbenzene) were recovered.

EXAMPLE 16

Into a 4-liter flask equipped with stirrer, reflux condenser, thermometer and dropping funnel, and placed in a water bath of 35° C., there was poured 1 liter of dry benzene and 54 grams of isobutylaluminum dichloride. Then 1 kg. of butine-(2) was added drop-by-drop with stirring over a period of 2 hours. The stirring was then continued for another 54 hours at a temperature of 35° C. The reaction mixture was further processed as explained in Example 11. 300 grams of butine-(2), 285 grams of hexamethyl-Dewar-benzene and 270 grams of residue (including 80 grams of hexamethylbenzene) were recovered.

EXAMPLE 17

Into a 4-liter flask equipped with stirrer, reflux condenser, thermometer and dropping funnel, and placed in a water bath of 35° C., there was poured liter of dry benzene and 50 grams of n-hexylaluminum dichloride. Then 1 kg. of butine-(2) was added drop-by-drop with stirring over a period of 2 hours. The stirring was then continued for another 30 hours at a temperature of 35° C. The reaction mixture was further processed as explained in Example 11. 370 grams of butine-(2), 220 grams of hexamethyl-Dewar-benzene and 220 grams of residue (including 55 grams of hexamethylbenzene) were recovered.

I claim:
1. Process for the preparation of hexamethyl-bicyclo-[2,2,0]hexadiene-(2,5) which comprises heating butine-(2) at temperatures ranging from 0 to 50° C. in the presence of an inert solvent with an aluminum compound selected from the group consisting of anhydrous aluminum chloride, aluminum bromide, alkylaluminum dichlorides and alkylaluminum dibromides.

2. Process as defined in claim 1 in which the temperature is maintained within the range from 20 to 35° C.

3. Process according to claim 1 in which the aluminum compound is employed in quantity ranging from 0.5 to 10% by weight relative to the butine-(2).

4. Process as defined in claim 3 in which the quantity of aluminum compound is within the range from 3 to 8%.

References Cited

UNITED STATES PATENTS 3,377,389   4/1968   Griesbaum.

OTHER REFERENCES

W. Schäfer: Angew Chem., 78, p. 716, 1966 (German); Angew Chem. Inter. ed., 5, p. 669, 1966 (English).

R. Criegee: Angew. Chem., 74, 703, 1962 (German); Angew Chem. Inter. ed., 1, pp. 519–20, 1962 (English).

C. E. Berkoff et al.: Chem. Soc. (London), Proceedings, p. 312, 1961; J. Chem. Soc. (London), p. 194, 1965.

DELBERT E. GANTZ, *Primary Examiner.*

V. O'KEEFE, *Assistant Examiner.*